March 17, 1959    J. ROBELL ET AL    2,878,103
PROCESS FOR THE PRODUCTION OF ANHYDROUS HYDRAZINE
Filed Sept. 21, 1955
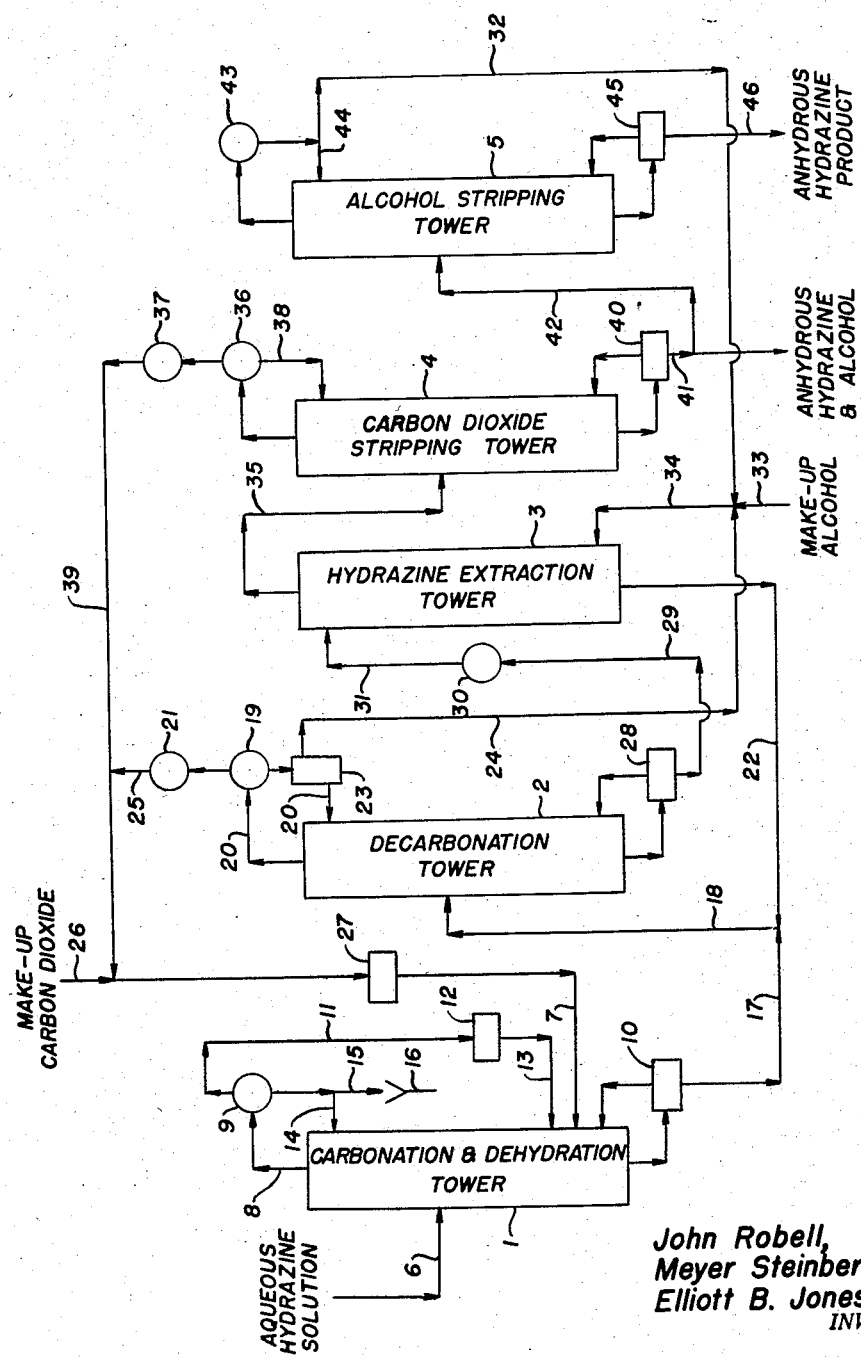
John Robell,
Meyer Steinberg &
Elliott B. Jones
INVENTORS
BY Charles J. Elderkin
ATTORNEY United States Patent Office 2,878,103
Patented Mar. 17, 1959

2,878,103

PROCESS FOR THE PRODUCTION OF ANHYDROUS HYDRAZINE

John Robell, West Hempstead, Meyer Steinberg, Long Island City, and Elliott B. Jones, Levittown, N. Y., assignors to Guggenheim Brothers (1949 Firm), a copartnership Application September 21, 1955, Serial No. 535,651

14 Claims. (Cl. 23—190)

This invention relates to chemistry and has for an object the provision of an improved process for the production of chemical compounds. More particularly, the invention contemplates the provision of an improved process for producing anhydrous hydrazine and useful products containing anhydrous hydrazine.

This application is a continuation-in-part of our copending United States application Serial No. 447,024, filed August 2, 1954, and entitled, "Production of Anhydrous Hydrazine," and relates to various modifications and improvements in the process described therein.

As manufactured in accordance with present commercial installations, hydrazine is obtained, initially, in the form of dilute aqueous solutions. Thus, for example, in the commercial so-called "Raschig" type process, hydrazine is obtained, initially, in the form of a solution consisting essentially of hydrazine and water in which hydrazine is present in an amount by weight equal to about one percent (1.0%) to two percent (2.0%) of the weight of the aqueous solution. While hydrazine is a highly valued industrial compound having a wide field of application or use, in such a state of dilution its usefulness is limited. Accordingly, these initial dilute solutions of hydrazine customarily are subjected to concentration treatments to produce aqueous solutions containing hydrazine in greater and more readily usable concentrations, or to produce an even more valuable product, anhydrous, or substantially anhydrous hydrazine.

Concentration of dilute solutions of hydrazine can be effected relatively economically through the use of conventional fractional distillation techniques to provide aqueous solutions consisting essentially of water and hydrazine in which hydrazine may be present in an amount by weight up to about sixty-six percent (66%) of the weight of the concentrated solution; the hydrazine being present largely or substantially entirely in the form of hydrazine hydrate ($N_2H_4 \cdot H_2O$), in which hydrazine constitutes sixty-four percent (64%) of the overall weight of the hydrate. Owing, however, to the fact that hydrazine and water ultimately form an azeotropic or constant boiling mixture as the concentration of hydrazine relatively to the concentration of water increases, it is impossible to produce anhydrous, or substantially anhydrous hydrazine through the use of such fractional distillation techniques.

A number of processes and procedures for separating hydrazine from water contained in the azeotropic or constant boiling mixtures with the production and recovery of anhydrous hydrazine have been proposed and employed heretofore. Typical of these known processes and procedures are: (1) a process involving precipitation of relatively insoluble monohydrazine sulphate from dilute aqueous solutions of hydrazine by the addition of sulphuric acid, followed by decomposition of the sulphate by means of either anhydrous liquid ammonia, as such, or a solution of anhydrous ammonia in a non-aqueous liquid in which both ammonia and hydrazine are soluble and in which ammonium sulphate formed during the course of the process is insoluble, separation of the solution from the solid ammonium sulphate, and fractional distillation of the solution for the recovery of the desired end product; (2) a process involving selective addition to the water-hydrazine azeotropic mixture of a reagent capable of forming with water a lower-boiling point azeotrope, followed by fractional distillation to remove the lower-boiling point azeotrope thus formed, and subsequent fractional distillation of the residual hydrazine-containing liquid for recovery of the anhydrous product; and (3) a process involving partitioning through the addition to the water-hydrazine azeotrope of a reagent capable of developing a system consisting of two immiscible liquids, one of which is capable of dissolving and retaining water to a greater extent than is the water-hydrazine azeotrope, followed by separation and fractional distillation of the hydrazine-rich liquid thus produced.

While the foregoing processes can be employed for the production of anhydrous hydrazine, each is characterized by certain inherent objectionable features. Thus, for example, in the process involving precipitation and treatment with ammonia of monohydrazine sulphate, the necessary liquid-slurry separations are difficult and expensive to carry out, appreciable losses of hydrazine are unavoidable, and the disposal or utilization of the ammonium sulphate by-product creates a costly problem. In the process involving the formation of a lower-boiling point azeotrope, many control features and factors essential to proper operation of the process are highly critical, and slight deviations or transient departures from optimum design conditions will upset the system and prevent proper separation and recovery of anhydrous hydrazine. Furthermore, all of the anhydrous hydrazine produced must be handled in the vapor state, and, in certain portions of the essential apparatus, part of the hydrazine must be handled at temperatures as high as 80° C. above the normal boiling temperature of hydrazine. The handling of large volumes of concentrated hydrazine vapor at high temperatures is extremely dangerous, in that, the constant presence of hydrazine vapor at high temperatures constitutes a continuing and ever-present explosion hazard. In the process employing the partitioning principle, also, large volumes of hydrazine vapor must be handled at temperatures several degrees higher than the normal boiling temperature of hydrazine, such that an explosion hazard is created.

In our aforementioned copending application we have described and claimed a process for the production of anhydrous hydrazine based in part on our discovery that compounds which are complexes of hydrazine and carbon dioxide such, for example, as carbazic acid ($HCO_2N_2H_3$) and hydrazinium carbazate ($N_2H_5CO_2N_2H_3$), can be employed effectively and advantageously, both from an operational and economical standpoint, and without the danger inherent in the above-mentioned prior processes, to produce anhydrous hydrazine as well as compositions of matter containing anhydrous hydrazine as a principal component. Thus, as described in our copending application, a mixture comprising hydrazinium carbazate or carbazic acid, or both, and an organic medium, such as an alcohol, in which hydrazinium carbazate and carbazic acid are insoluble but which is capable of dissolving hydrazine, is heated to decompose hydrazinium carbazate and carbazic acid to form gaseous carbon dioxide, which is eliminated, and anhydrous hydrazine which dissolves in the solvent medium forming an anhydrous hydrazine solution from which the pure product may be separated and recovered by simple fractional distillation techniques.

The process of our prior application consists essentially of three major stages or steps, in the first of which aqueous hydrazine is subjected to a carbonation and dehydration treatment wherein gaseous carbon dioxide is bubbled through the solution to produce an aqueous solution of hydrazinium carbonate by a reaction which may be indicated generally by the equation:

(I) $\quad 2N_2H_4(aq.) + H_2O + CO_2(g.) \longrightarrow (N_2H_5)_2CO_3(aq.)$
(Hydrazinium carbonate)

The aqueous solution thus produced is heated under a carbon dioxide atmosphere to effect vaporization of all of the water present in the solution with the production of anhydrous or water-free hydrazinium carbazate by a reaction which may be indicated generally by the equation:

(II) $\quad (N_2H_5)_2CO_3(aq.) \xrightarrow{heat} N_2H_5CO_2N_2H_3 + H_2O(g.)$

In the second stage or step of our prior process, a mixture consisting of an alcohol, and preferably a low-boiling point alcohol such as methanol or ethanol, and the hydrazinium carbazate produced in the initial stage, which is insoluble in alcohol, is heated to a temperature sufficiently high to effect decomposition of the hydrazinium carbazate with the production of hydrazine and gaseous carbon dioxide. Carbon dioxide is removed from the liquid phase during this operation and the anhydrous hydrazine dissolved in the alcoholic solvent. The foregoing reaction may be represented generally by the following equation:

(III)
$\quad N_2H_5CO_2N_2H_3 + ROH \xrightarrow{heat} 2N_2H_4(anhy.) + ROH + CO_2(g.)$ In the third stage or step of our prior process, the alcohol solution of hydrazine is heated to a temperature sufficiently high and under such conditions of control that all of the alcohol contained in the solution is vaporized and a residue consisting essentially of anhydrous hydrazine is produced.

In accordance with the process of our prior application and as indicated by Equation III above, carbon dioxide is separated from the hydrazine-carbon dioxide complex by an extractive distillation procedure, i. e., by stripping the carbon dioxide from the liquid phase, under an alcohol reflux, at the boiling point of the mixture.

The process of our present invention is based in part on our discovery that the composition of the hydrazine-carbon dioxide liquid mixture, which boils between 140° and 141° C. (azeotropic), corresponds to a molar ratio of hydrazine to carbon dioxide above 2.0, and generally about 2.24, equivalent to a concentration by weight of hydrazine of sixty-two percent (62%), and thirty-eight percent (38%) carbon dioxide. That is to say, the molar ratio of hydrazine to carbon dioxide in this azeotropic hydrazine-carbon dioxide liquid mixture, is approximately twelve percent (12.0%) higher than the corresponding molar ratio of hydrazine to carbon dioxide in hydrazinium carbazate ($N_2H_5CO_2N_2H_3$). Furthermore, we have found that an analogous situation exists with respect to the hydrazine-water system, in that, the azeotropic or constant boiling mixture of hydrazine and water contains hydrazine and water in a molar ratio which is approximately 12.3% higher than the corresponding molar ratio, of hydrazine to water, in hydrazine hydrate ($N_2H_5OH$).

We have further found that upon mixing the above-mentioned hydrazine-carbon dioxide azeotropic mixture with an alcohol, while maintaining the temperature below the boiling point of the mixture and below the point at which gaseous carbon dioxide is released, in contrast to the extractive distillation technique employed in the process of our prior application, two distinct liquid layers or phases are formed which permit a liquid-liquid extraction of hydrazine from the hydrazine-carbon dioxide azeotropic mixture. Thus, upon mixing the azeotropic mixture with alcohol, part of the hydrazine and a relatively small amount of carbon dioxide is extracted by the alcohol from the mixture and forms an upper layer of a two-phase liquid system. As a result of this liquid-liquid extraction phenomenon, the hydrazine-carbon dioxide mixture making up the lower layer of the two-phase system, becomes relatively richer in carbon dioxide and also takes up a small amount of alcohol. Depending on the relative amounts of alcohol and hydrazine within the system, the ratio of hydrazine to carbon dioxide in the lower liquid phase can be reduced to a value below 2.0. Upon separating the two layers or phases, the bottom layer can be made to release carbon dioxide readily by heating, after which the molar ratio of hydrazine to carbon dioxide in this layer is returned to the azeotropic concentration of about 2.24. The upper alcohol layer can be fractionated to yield substantially pure anhydrous hydrazine.

As will be readily appreciated, the foregoing discoveries render it possible for us to dispense with heating of the hydrazine-carbon dioxide mixture under an alcohol reflux for removal of carbon dioxide in the manner of our prior process, and, therefore, permit us to effect a more economical and efficient recovery of anhydrous hydrazine than is possible in accordance with the process of our prior application.

The step for separating hydrazine from carbon dioxide in accordance with a process of our present invention may be represented in general by the equations:

(IV) $\quad N_2H_5CO_2N_2H_3$
Hydrazinium carbazate or $(N_2H_4 + CO_2)$
Azeotropic mixture $+ ROH = N_2H_4$ (dissolved in ROH)
$+ HCO_2N_2H_3$
Carbazic acid and (V) $\quad 2HCO_2N_2H_3 \xrightarrow{heat} CO_2(g.) + N_2H_5CO_2N_2H_3$
Carbazic acid $\qquad\qquad$ Hydrazinium carbazate Equation IV above represents the liquid-liquid extraction of hydrazine from either the hydrazinium carbazate or from the hydrazine-carbon dioxide azeotropic mixture, with the formation of a solution of anhydrous hydrazine dissolved in alcohol, and carbazic acid, the latter being insoluble in the alcohol. On the basis of our investigations, we have found that this extraction can be effected quite readily below the boiling point of the mixture and without the evolution of gaseous carbon dioxide. As the temperature of the mixture is increased, carbon dioxide is released and the alcohol begins to boil off and can be refluxed, in the manner described in our copending application.

It is believed that the evolution of carbon dioxide is probably due to the decomposition of carbazic acid as represented by Equation V above. Thus, as the concentration of hydrazine in the alcohol increases, Reaction IV tends to slow down apparently with the result that smaller amounts of carbazic acid are formed, thereby decreasing the carbon dioxide activity, and slowing down the evolution of carbon dioxide. Since the only two compounds known to be present in the liquid phase in the system $N_2H_4$—$CO_2$, are hydrazinium carbazate containing two (2) moles of hydrazine to one (1) mole of carbon dioxide, and carbazic acid containing one (1) mole of hydrazine to one (1) mole of carbon dioxide, it is believed that the fact that the lower layer contains a molar ratio of hydrazine to carbon dioxide of less than 2 following alcohol extraction, indicates that this layer consists of a mixture of these compounds; as further indicated by the fact that the $N_2H_4$—$CO_2$ molar ratio returns to the azeotropic value ($2.24 N_2H_4$:$CO_2$) upon heating, or, in accordance with the foregoing theory, upon decomposition of the alcohol-insoluble carbazic acid apparently present in this layer.

As in the extractive distillation step of our prior process, we may employ both monohydric and polyhydric alcohols in the liquid-liquid alcohol extraction of hydrazine from carbon dioxide according to the process of our present invention. Specifically, alcohols that we have employed effectively include methyl alcohol, ethyl alcohol, n-propyl alcohol, isopropyl alcohol, n-butyl alcohol, isobutyl alcohol, allyl alcohol, ethylene glycol and glycerol. We prefer, however, to employ aliphatic alcohols, either saturated or unsaturated, and, in particular, an alcohol having a boiling point lower than the boiling point of hydrazine in order to avoid vaporization of hydrazine during distillation of the alcohol-hydrazine solutions for the separation and recovery of anhydrous hydrazine. In employing low-boiling point alcohols, such, for example, as methyl alcohol (methanol) and ethyl alcohol (ethanol), in conjunction with aqueous solutions of hydrazine containing approximately fifty-four percent (54%) by weight of hydrazine, we have effected substantially complete recoveries of hydrazine in the form of anhydrous hydrazine products containing not less than ninety-eight percent (98%) by weight of hydrazine.

If warranted by economic or other conditions, we may employ alcohols having boiling points higher than the boiling point of hydrazine and effect recovery of the anhydrous end product by vaporization and condensation of hydrazine. Results comparable with those obtained with relatively low-boiling point alcohols may be obtained when relatively high-boiling point alcohols are employed in this manner. As hereinbefore suggested, however, it usually is advisable to avoid the use of the higher-boiling point alcohols requiring vaporization of hydrazine because of hazards that may be involved. Of course, the invention provides a simple, effective and relatively inexpensive process for producing water-free compositions of hydrazine and alcohol which are directly usable, for example, as fuels, and wherein other factors may be determinative insofar as the choice of an alcohol is concerned.

In carrying out a prefered complete process of our present invention, we employ as the starting raw material aqueous hydrazine in either the liquid state or the gaseous state. The aqueous hydrazine we employ may be a dilute solution similar to that produced initially in carrying out a Raschig-type process; it may be a more concentrated solution obtained through fractional distillation of such a dilute solution; it may be a relatively low-quality (with respect to hydrazine content) product formed in carrying out a heretofore customary type of process intended for the production of anhydrous hydrazine; or it may be of any concentration at or below the azeotropic concentration. In fact, the process of the invention can be utilized for completing the production of anhydrous hydrazine from any point of concentration at or above the azeotropic concentration reached by any other process.

A preferred complete process of our present invention comprises the steps of (1) carbonating and dehydrating an aqueous solution of hydrazine to produce substantially anhydrous hydrazinium carbazate containing some excess carbon dioxide; (2) partial decarbonation of the hydrazinium carbazate to remove excess carbon dioxide with the formation of a hydrazine-carbon dioxide azeotropic mixture; (3) alcoholic extraction of the hydrazine-carbon dioxide azeotropic mixture with the formation of separate liquid phases comprising (a) a solution of substantially anhydrous hydrazine in alcohol, and (b) a hydrazine-carbon dioxide mixture having a molar ratio of hydrazine to carbon dioxide of less than 2 and containing hydrazinium carbazate and carbazic acid, which is recycled to the decarbonation stage; and (4) fractional distillation of the hydrazine-alcohol solution with the recovery of substantially pure anhydrous hydrazine.

The invention may be best understood by reference to the following description of specific embodiments thereof, taken in conjunction with the accompanying drawing wherein the single figure is a schematic flow diagram or flowsheet illustrating a typical arrangement of apparatus suitable for practicing our process on a continuous basis. The process illustrated by the flow diagram of the drawing and described hereinafter is based on the use of methyl alcohol in the extraction stage, and the temperatures and temperature ranges given for respective operations within the overall process are based on a pressure of one atmosphere.

With reference to the drawing, apparatus suitable for use in carrying out a preferred complete process of our invention may comprise a carbonation and dehydration tower 1, a decarbonation tower 2, a hydrazine extraction tower 3, a carbon dioxide stripping tower 4, and an alcohol stripping tower 5, in which the major steps of the process are carried out, together with various auxiliary equipment associated with each of the towers, as identified hereinafter. All units of the apparatus employed in effecting a process of the invention are of standard construction, and each is formed of suitable materials known to be capable of resisting corrosion satisfactorily under its conditions of use.

In employing apparatus of the type indicated in the flow diagram, aqueous hydrazine from any suitable source, and preferably below the azeotropic composition, is introduced (6) into the carbonation and dehydration tower 1 near the middle thereof, as indicated on the drawing, for downward flow therethrough in contact with and in counter-current flow with respect to a bubbling stream of gaseous carbon dioxide introduced (7) near the bottom of the tower. The aqueous solution of hydrazine is carbonated and distilled in tower 1. Water is driven off and removed (8) from the top of the tower through reflux condenser 9 which maintains the temperature of the effluent stream under approximately 100° C.; the exact temperature depending on the quantity of circulating gaseous carbon dioxide. Reboiler 10, at the bottom of tower 1 is maintained at approximately 138° C. in order to provide for the production of substantially anhydrous hydrazinium carbazate containing some excess carbon dioxide.

Carbon dioxide recovered from the water vapor in condenser 9 is passed (11) through a carbon dioxide heater 12 and recycled (13) to tower 1. Water from condenser 9 may be passed (14) to tower 1 and utilized in appropriate amounts and at appropriate times for reflux purposes, or passed (15) to waste through a suitable drain 16.

The hydrazinium carbazate stream (17) coming from reboiler 10, is passed (18) to a small decarbonation tower 2, wherein excess carbon dioxide is removed with the production of the hydrazine-carbon dioxide azeotropic mixture. A water cooled condenser 19 provided at the top of tower 2 functions to reflux (20) the hydrazinium carbazate. This condenser is followed by a low-temperature condenser 21 for condensing and recovering alcohol introduced into this tower from recycled (22) hydrazinium carbazate and carbazic acid recovered from the hydrazine extraction tower 3, as explained hereinafter. The recovered alcohol is separated from hydrazinium carbazate in a separator 23 and is returned (24) to tower 3 for the extraction operation. The gaseous carbon dioxide recovered in low-temperature condenser 21 is passed (25) together with a supply (26) of make-up carbon dioxide, as required, to a carbon dioxide heater 27 to provide the stream of carbon dioxide introduced (7) at the bottom of carbonation and dehydration tower 1. Reboiler 28 maintains a temperature of 140–141° C. at the bottom of decarbonation tower 2 for the formation of the hydrazine-carbon dioxide azeotropic mixture.

The hydrazine-carbon dioxide azeotropic mixture from reboiler 28 is passed (29) to a cooler 30 wherein the temperature of the mixture is reduced to approximately 64° C. and it is thence passed (31) to the top of hydrazine extraction tower 3. Liquid methyl alcohol, comprising the stream (34) recycled from separator 23 associated with tower 2, a stream (32) recycled from alcohol stripping tower 5, and a make-up supply (33), as required, is passed (34) to the bottom of tower 3 and moved in counter-current flow to the azeotropic hydrazine-carbon dioxide mixture through the tower. The temperature throughout extraction tower 3 is maintained between 50–60° C. by controlling the amount of cooling water fed to water cooler 30. Hydrazinium carbazate and carbazic acid recovered from the lower part of tower 3 is recycled (22) to decarbonation tower 2, whereas the extracted methanol layer, withdrawn from the top of tower 3 is passed (35) to the carbon dioxide stripping tower 4.

The top of tower 4 is provided with a water cooled reflux condenser 36, followed by a low-temperature condenser 37 which condenses and recovers essentially all the methyl alcohol from the stripped carbon dioxide and returns (38) the condensed alcohol to the top of the tower. The carbon dioxide is passed (39) to the recycle and make-up supply for use in carbonation and dehydration tower 1. The temperature at the top of tower 4 is maintained at 64.5° C. The bottom of tower 4 is provided with a reboiler 40 which maintains the temperature at the boiling point of the alcohol-hydrazine solution (65–75° C.), the exact temperature depending on the hydrazine content of the solution. The bottom stream (41) from reboiler 40, containing substantially anhydrous hydrazine and alcohol may be drawn off for marketing as such, or passed (42) to an alcohol stripping tower 5.

In tower 5 the alcohol is removed by fractional distillation leaving anhydrous hydrazine at the bottom of the tower. The top of tower 5 is provided with a reflux condenser 43 which supplies an alcohol reflux stream (44) to tower 5 as well as stream 32 for recycling of condensed alcohol to the hydrazine extraction tower 3. The bottom of this tower is provided with a reboiler 45 which maintains the temperature at the bottom of the tower at 113.5° C. The product withdrawn (46) from the bottom of reboiler 45 is substantially pure anhydrous hydrazine.

For purposes of illustration, we have described the carbonation and dehydration step of our process based on the use of gaseous carbon dioxide as the carbonating agent, but we may also employ a salt or other compound containing carbon dioxide in chemical combination, such, for example, as a carbonate ammonium.

According to our experiences, hydrazinium carbazate and the azeotropic mixture of hydrazine and carbon dioxide employed in the process of the invention, can be handled with greater safety than can most other known compounds of hydrazine. For example, we have handled hydrazinium carbazate with complete safety and confidence when heated to temperatures as high as about 170° C. For practical purposes, the hydrazinium carbazate or azeotropic mixture of hydrazine and carbon dioxide boiling at 140°–141° C., may be viewed as a "binary complex" of hydrazine and carbon dioxide, in the sense that the mixture does not decompose upon heating and cannot be separated into hydrazine and carbon dioxide by fractionation, and, of course, is anhydrous in nature.

The following specific examples illustrate the practical application of the foregoing principles and procedures and typical results obtained on a batchwise basis in accordance with the process of the invention:

Example I

An aqueous solution of hydrazine containing 54.0% by weight of hydrazine was carbonated with gaseous carbon dioxide and heated under a carbon dioxide atmosphere until the temperature in the still pot reached 141° C. The resulting residue was analyzed and found to contain 62% by weight of hydrazine and 38% by weight of carbon dioxide which corresponds to a molar ratio of hydrazine to carbon dioxide of 2.24. Methyl alcohol was added to this product in the proportion of 0.96 mole of alcohol to 1.0 mole of hydrazine. The mixture was then heated with stirring on a constant temperature bath at 50° C. There was no evolution of carbon dioxide. After a certain length of time when it was judged that equilibrium had been reached, the two liquid phases or layers were separated and analyzed. The upper layer was found to contain 13.1% by weight of hydrazine and 2.0% by weight of carbon dioxide, the remainder being methyl alcohol. The bottom layer was found to contain 57.0% by weight of hydrazine and 37.8% by weight of carbon dioxide, equivalent to a molar ratio of hydrazine to carbon dioxide of 2.07. Approximately 13.6% of the original hydrazine was found in the upper methanol layer. The separated alcohol phase was then distilled under a total methanol reflux in order to remove carbon dioxide, and, thereafter, the alcohol was allowed to distill off until a temperature of 114° C. was reached in the still pot. The residue analyzed 95% of hydrazine by weight.

Example II

An aqueous solution of hydrazine containing 54% by weight of hydrazine was carbonated with gaseous carbon dioxide and heated under a carbon dioxide atmosphere until the temperature in the still pot reached 141° C. for the formation of an azeotropic mixture or binary complex of hydrazine and carbon dioxide. The residue was analyzed and found to contain 62% by weight of hydrazine and 38% by weight of carbon dioxide, which corresponds to a molar ratio of hydrazine to carbon dioxide of 2.24. Methyl alcohol was added to this product in the proportion of 7.65 moles of alcohol to 1.0 mole of hydrazine. The mixture was then stirred in a constant temperature bath at 50° C. After a certain length of time, when it was judged that equilibrium had been reached, the two liquid layers or phases were separated and analyzed. The upper layer or phase was found to contain 4.4% by weight of hydrazine and 0.8% by weight of carbon dioxide, the remainder being methyl alcohol. The bottom layer was found to contain 54.4% by weight of hydrazine and 41.0% by weight of carbon dioxide equivalent to a molar ratio of hydrazine to carbon dioxide of 1.82. Approximately 35.3% of the original hydrazine content of the aqueous solution was found in the upper alcohol layer. The separated upper alcohol layer was then distilled under a total methyl alcohol reflux in order to remove the carbon dioxide, and, thereafter, the alcohol was allowed to distill off until a temperature of 114° C. was reached in the still pot. The residue analyzed 94% of hydrazine by weight. The lower layer was heated and distilled until a temperature of 140° C. was reached in the still pot. Methyl alcohol and carbon dioxide were removed from the top of the still. The residue analyzed 60.3% hydrazine and 36.5% carbon dioxide corresponding to a molar ratio of hydrazine to carbon dioxide of 2.27.

Since it is considered obvious that some changes and modifications can be made in the foregoing methods and procedures without departing from the nature and spirit of our invention, it is to be understood that the invention is not to be limited to the specific details offered by way of illustration above, except as set forth in the following claims.

We claim:

1. In a process for producing anhydrous hydrazine, the improvement that comprises forming an anhydrous binary complex of hydrazine and carbon dioxide selected from the group consisting of hydrazinium carbazate and the azeotropic mixture of hydrazine and carbon dioxide boiling at 140–141° C., and extracting hydrazine from said hydrazine-carbon dioxide complex with an alcohol in the liquid phase.

2. In a process for producing anhydrous hydrazine, the improvement which comprises extracting hydrazine from anhydrous hydrazinium carbazate with alcohol in the liquid phase.

3. In a process for producing anhydrous hydrazine, the improvement which comprises forming an azeotropic mixture of hydrazine and carbon dioxide, and extracting hydrazine from the azeotropic mixture with a saturated aliphatic alcohol in the liquid phase.

4. In a process for producing anhydrous hydrazine, the improvement which comprises forming an azeotropic mixture of hydrazine and carbon dioxide, and extracting hydrazine from the azeotropic mixture with an unsaturated aliphatic alcohol in the liquid phase.

5. In a process for producing anhydrous hydrazine, the improvement which comprises forming an azeotropic mixture of hydrazine and carbon dioxide, and extracting hydrazine from the azeotropic mixture with a monohydric alcohol in the liquid phase.

6. In a process for producing anhydrous hydrazine, the improvement which comprises forming an azeotropic mixture of hydrazine and carbon dioxide, and extracting hydrazine from the azeotropic mixture with a polyhydric alcohol in the liquid phase.

7. In a process for producing anhydrous hydrazine, the improvement which comprises forming an azeotropic mixture of hydrazine and carbon dioxide, and extracting hydrazine from the azeotropic mixture in the liquid phase with an alcohol selected from the group consisting of methyl alcohol, ethyl alcohol, n-propyl alcohol, isopropyl alcohol, n-butyl alcohol, isobutyl alcohol, allyl alcohol, ethylene glycol and glycerol.

8. In a process for producing anhydrous hydrazine, the improvement that comprises forming an anhydrous binary complex of hydrazine and carbon dioxide selected from the group consisting of hydrazinium carbazate and the azeotropic mixture of hydrazine and carbon dioxide boiling at 140–141° C., and extracting hydrazine from said hydrazine-carbon dioxide complex with an alcohol in the liquid phase at a temperature below the boiling point of the complex.

9. In a process for producing anhydrous hydrazine, the improvement which comprises extracting hydrazine from liquid anhydrous hydrazinium carbazate in the liquid phase with alcohol at a temperature below the boiling point of hydrazinium carbazate.

10. A process for the production of anhydrous hydrazine which comprises subjecting aqueous hydrazine to carbonation and vaporization treatments to form substantially anhydrous hydrazinium carbazate, subjecting the anhydrous hydrazinium carbazate to a decarbonation treatment to form an azeotropic mixture of hydrazine and carbon dioxide, extracting the azeotropic mixture of hydrazine and carbon dioxide with alcohol in the liquid phase to separate and recover a solution comprising anhydrous hydrazine and alcohol, heating the solution comprising anhydrous hydrazine and alcohol to vaporize the hydrazine, and collecting and condensing the vaporized hydrazine.

11. A process for the production of anhydrous hydrazine which comprises subjecting aqueous hydrazine to carbonation and vaporization treatments to form substantially anhydrous hydrazinium carbazate, subjecting the anhydrous hydrazinium carbazate to a decarbonation treatment to form an azeotropic mixture of hydrazine and carbon dioxide, extracting the azeotropic mixture of hydrazine and carbon dioxide with alcohol in the liquid phase to separate and recover a solution comprising anhydrous hydrazine and alcohol, and heating the solution comprising anhydrous hydrazine and alcohol to vaporize the alcohol and recover as a residue a product consisting essentially of anhydrous hydrazine.

12. A process for the production of anhydrous hydrazine which comprises subjecting aqueous hydrazine to carbonation and vaporization treatments to remove water and form substantially anhydrous hydrazinium carbazate, subjecting the anhydrous hydrazinium carbazate to a decarbonation treatment at a temperature within the range 140–141° C. to form an azeotropic mixture of hydrazine and carbon dioxide, extracting the azeotropic mixture of hydrazine and carbon dioxide with alcohol in the liquid phase to separate and recover a solution comprising anhydrous hydrazine and alcohol, and heating the solution comprising anhydrous hydrazine and alcohol to vaporize the alcohol and recover as a residue a product consisting essentially of anhydrous hydrazine.

13. A process for the production of anhydrous hydrazine which comprises subjecting aqueous hydrazine to carbonation and vaporization treatments to remove water and form substantially anhydrous hydrazinium carbazate, subjecting the anhydrous hydrazinium carbazate to a decarbonation treatment at a temperature within the range 140–141° C. to form an azeotropic mixture of hydrazine and carbon dioxide having a molar ratio of hydrazine to carbon dioxide of approximately 2.24, extracting the azeotropic mixture of hydrazine and carbon dioxide with methyl alcohol in the liquid phase to separate and recover a solution comprising anhydrous hydrazine and methyl alcohol, and heating the solution comprising anhydrous hydrazine and methyl alcohol to vaporize the methyl alcohol and recover as a residue a product consisting essentially of anhydrous hydrazine.

14. A process for the production of anhydrous hydrazine which comprises subjecting aqueous hydrazine to carbonation and vaporization treatments to remove water and form substantially anhydrous hydrazinium carbazate, subjecting the anhydrous hydrazinium carbazate to a decarbonation treatment at a temperature within the range 140–141° C. to form an azeotropic mixture of hydrazine and carbon dioxide having a molar ratio of hydrazine to carbon dioxide of approximately 2.24, extracting the azeotropic mixture of hydrazine and carbon dioxide with methyl alcohol in the liquid phase to separate and recover two liquid phases consisting of (a) a solution comprising anhydrous hydrazine and methyl alcohol, and (b) a mixture comprising hydrazinium carbazate and carbazic acid having a molar ratio of hydrazine to carbon dioxide of less than 2.0, heating the solution comprising anhydrous hydrazine and methyl alcohol to vaporize the methyl alcohol and recover as a residue a product consisting essentially of anhydrous hydrazine, heating the mixture comprising hydrazinium carbazate and carbazic acid to produce a hydrazine-carbon dioxide mixture of azeotropic concentrations of hydrazine and carbon dioxide, and recycling the azeotropic mixture thus produced for extraction with additional quantities of methyl alcohol.

References Cited in the file of this patent

"The Chemistry of Hydrazine," by L. F. Audrieth and B. A. Ogg, 1951 edition, pp. 212, 214. John Wiley and Sons, Inc., N. Y.

J. W. Mellor's "A Comprehensive Treatise on Inorganic and Theoretical Chemistry," vol. 8, 1928 edition, page 327 (first full paragraph). Longmans, Green and Co., N. Y.